(12) United States Patent
Heo (10) Patent No.: US 8,376,464 B2
(45) Date of Patent: Feb. 19, 2013

(54) VEHICLE RECLINER

(75) Inventor: Chang-Beom Heo, Incheon (KR)

(73) Assignee: KM & I Co., Ltd. (KR)

( * ) Notice: Subject to any disclaimer, the term of this patent is extended or adjusted under 35 U.S.C. 154(b) by 384 days.

(21) Appl. No.: 12/822,883

(22) Filed: Jun. 24, 2010

(65) Prior Publication Data

US 2010/0259086 A1 Oct. 14, 2010

Related U.S. Application Data

(63) Continuation-in-part of application No. 11/570,905, filed on Dec. 19, 2006, now abandoned.

(30) Foreign Application Priority Data

Aug. 13, 2004 (KR) .................. 10-2004-0063844
Aug. 13, 2004 (KR) .................. 20-2004-0023171 U (51) Int. Cl.
*B60N 2/02* (2006.01)
(52) U.S. Cl. ............................ 297/367 R; 229/378.12
(58) Field of Classification Search .......... 297/365–367, 297/378.12
See application file for complete search history.

(56) References Cited

U.S. PATENT DOCUMENTS

| | | | |
|---|---|---|---|
| 6,024,410 A | 2/2000 | Yoshida | |
| 6,092,874 A | 7/2000 | Kojima et al. | |
| 6,095,608 A | 8/2000 | Ganot et al. | |
| 6,312,053 B1 | 11/2001 | Magyar | |
| 6,474,740 B1 | 11/2002 | Kondo et al. | |
| 6,626,495 B2 | 9/2003 | Okazaki et al. | |
| 6,666,515 B2 | 12/2003 | Asano et al. | |
| 6,749,263 B2 | 6/2004 | Peters | |
| 6,854,802 B2 | 2/2005 | Matsuura et al. | |
| 6,908,156 B1 | 6/2005 | Park et al. | |
| 6,991,294 B2 | 1/2006 | Choi | |
| 7,055,906 B2 | 6/2006 | Shinozaki | |
| 7,100,987 B2 | 9/2006 | Volker et al. | |

(Continued)

FOREIGN PATENT DOCUMENTS

EP 1215076 6/2002
GB 2117440 10/1983

(Continued)

OTHER PUBLICATIONS

International Search Report—PCT/KR2005/002515 dated Nov. 2, 2005.

*Primary Examiner* — Laurie Cranmer
(74) *Attorney, Agent, or Firm* — Cantor Colburn LLP (57) ABSTRACT

Disclosed herein is a seat recliner for a vehicle, in which gear teeth can be engaged tightly without any moving space at the time of adjusting the rotation angle of the seatback installed in a vehicle. Disclosed herein is a seat recliner for a vehicle, in which gear teeth can be engaged tightly without any moving space at the time of adjusting the rotation angle of the seatback installed in a vehicle. The seat recliner for the vehicle includes a holder equipped with a lock gear guide portion in a receiving portion opened at one side thereof, the lock gear guide portion having an arc shaped guide surface, an upper gear having gear teeth formed at an inner peripheral edge of the holder, the upper gear being engaged with the holder, an actuating cam located in the holder to be engaged with a rotation shaft extending through the center of the holder, and the actuating cam having a transporting projection and a first supporting projection at predetermined intervals on an outer peripheral edge thereof, and a lock gear including an outside gear teeth at front surface and with a contacting surface, a first supporting surface and a first engagement surface at a rear surface with the guide surface of the lock gear guide portion contacting with an outside of the lock gear.

2 Claims, 11 Drawing Sheets

| U.S. PATENT DOCUMENTS | | | | FOREIGN PATENT DOCUMENTS | | |
|---|---|---|---|---|---|---|
| 2002/0033627 A1 | 3/2002 | Hoshihara et al. | | JP | 2002-119349 | 4/2002 |
| 2002/0096925 A1 | 7/2002 | Uramichi | | JP | 2003-009978 | 1/2003 |
| 2002/0140267 A1 | 10/2002 | Ikegaya et al. | | KR | 10-1998-049859 | 9/1998 |
| 2004/0066078 A1 | 4/2004 | Matsuura et al. | | KR | 10-2001-0028852 | 4/2001 |
| 2004/0084945 A1 | 5/2004 | Toba et al. | | KR | 10-2003-0092870 | 12/2003 |
| 2004/0113475 A1 | 6/2004 | Uramichi et al. | | WO | 2004/067313 | 8/2004 |

VEHICLE RECLINER

This is a continuation-in-part application of application Ser. No. 11/570,905, filed on Dec. 19, 2006, which claims priority to Korean Application No. 10-2004-0063844, filed on Aug. 13, 2004, and Korean Application No. 20-2004-0023171, filed on Aug. 13, 2004. The entire contents of the above-referenced applications are hereby incorporated by reference.

BACKGROUND OF THE INVENTION

1. Field of the Invention

The present invention relates to a seat recliner for a vehicle, in particular, a seat recliner for a vehicle which is capable of being tightly engaged with gears without any moving space at the time of adjusting the rotation angle of the seatback for a vehicle.

2. Description of the Related Art

In general, a seat recliner for a vehicle is employed for adjusting the rotation angle of the seatback installed in a vehicle.

Seats are installed in a vehicle for a driver and fellow passengers to sit on, and especially seats for the driver and the assistant driver can be moved forwardly and rearwardly by means of transporting rails installed in the bottom surface of the vehicle body. Accordingly, when the seats for the driver and the assistant driver are fabricated, the seatback and the seat cushion are separately fabricated, and the angle of the seatback can be freely adjusted by means of the actuation of the seat recliner located between them, so that the driver and the assistant driver can take their seats comfortably and safely by adjusting positions of the seats and the angles of the seatbacks properly depending on their body shapes.

There have been several types of conventional seat recliner for a vehicle.

One of them is the seat recliner for the vehicle disclosed in Korean Utility Model Registration No. 313604.

In the conventional seat recliner for vehicle as explained above, an actuating cam pushes out a lock gear supported by a lock gear supporting portion of a holder outwardly on condition that it is located at the outer peripheral side by means of restoring force of a return spring, respective end of which being fixed to the actuating cam and the holder at the state of wound around the rotation shaft, so that the outside gear teeth formed at the outside of the lock gear supporting portion can be engaged with an inside gear teeth formed at the inner peripheral edge of a sector gear to thereby stop rotation of the sector gear fixed to the seatback. As a result, the seatback can be maintained at desired angles. Then, the angles of the seatback can be freely adjusted through the rotation of the sector gear fixed to the seatback in accordance with the separation between the outside gear teeth and the inside gear teeth, as the lock gear is pushed inwardly based on the rotation angle of the actuating cam urging the lock gear by the rotation of the rotation shaft, when a lever connected to the rotation shaft is held and pulled. Further, when the outside force applied to the lever is relieved after the completion of the angle adjustment of the seatback, the actuating cam pushes again the lock gear to the outside by means of the storing force of the return spring to thereby make the outside gear teeth and the inside gear teeth engaged with each other to result in maintenance of the fixed state of the seatback.

Such conventional seat recliner for the vehicle has been constructed and operated as follows. The lock gear is configured to move along transporting support surfaces of the seat recliner with regard to its center point after the lock gear to be located to contact with the first, second and the third transporting surfaces of the seat recliner having an arc shape. Further, the lock gear is provided with a relief projection and an engaging projection at respective inside end thereof and is moved by means of an actuating projection of the actuating cam, and the outside gear teeth of the lock gear are maintained to be tightly engaged with the inside gear teeth of the sector gear by making the locking projection to be closely contacted with the actuating projection of the actuating cam.

When artificial force is not applied to the rotation shaft at a state of fixing the seatback, the actuating projection of the actuating cam pushes the inner peripheral surface of the lock gear to the outside by means of the restoring force of the return spring so as to move the lock gear to the outside direction with regard to the first transporting support surface to thereby make the outside gear teeth to be engaged with the inside gear teeth of the sector gear, and then when the outside gear teeth of the lock gear is engaged with the inside gear teeth of the sector gear, as the actuating projection is maintained to be closely contacted with the locking projection to make the lock gear to be engaged with the sector gear tightly.

Further, when the angle of the seatback is required to be adjusted, the actuating projection which presses the locking projection according to the rotation angle of the actuating cam as the actuating cam rotates to one direction, pushes the relief projection to the rotation direction, so that the lock gear can move along the first transporting support surface with regard to the center point to thereby separate the outside gear teeth from the inside gear teeth to result in proper adjustment of the angle of the seatback due to free rotation of the sector gear.

However, in the conventional locking state of the seat recliner for the vehicle, the inside gear teeth and the outside gear teeth are at the state of engagement after the lock gear is moved to the outside direction along the first transporting support surface with regard to the center point. In this state, the fixing projection and the actuating projection of the actuating cam are maintained to simultaneously push the inside surface of the lock gear and the locking gear to thereby engage tightly with the outside gear teeth portion and the inside gear teeth portion which are joining vertical portion of the center point of the actuating cam and the other center point. As explained above, in the locking state, the outside gear teeth portion and the inside gear teeth portion are caught by three lock gears arranged at identical degrees of 120.

In this instance, it is intended that the strength of the gear teeth can be improved by allowing the lock gear to be applied of the outside force vertically and distributing force to all the outside gear teeth of the lock gear while locating a rotation center of the lock gear, which is actuated by the actuating cam, to be on a center line on which the outside and inside gear teeth are engaged with each other, that is, which is perpendicular to the center line of the lock gear. However, because the supporting point of the actuating cam and the lock gear which are defined to produce the strength of the outside and inside gear teeth, which becomes the criteria for the stress of the cut-away portion of the gear teeth produced from the outside force, has been configured to be strayed off and to be located away from the center line of the lock gear, and the force produced from the outside force can not be distributed and transferred effectively to the driving center of the lock gear which is vertical to the center line of the lock gear, so that it is impossible to maximize the supporting force of the actuating cam with regard to the lock gear produced from the outside force to thereby distribute the force to the outside gear teeth in imbalance to result in reduction of the strength.

Furthermore, although the stress has been made to concentrate due to the outside force and the strength of the lock gear has been improved by making the actuating projection of the cam and the locking projection press the lock gear and the actuating cam respectively, such two point supporting force can only compensate for the strength with regard to the front load, that is, it can operate in a side direction with regard to the relief pressure of the gear teeth cut away portion, which is produced from the deformation of the holder supporting the lock gear and is concentrated on the gear teeth cut away portion along the load direction, and it can not compensate for the back load, so that the strength deviation of the seat recliner between the forward and backward direction becomes larger to thereby cause several defects in the products such as deterioration of the quality of the products, and the like in actual producing conditions.

In addition, the lock gear has the rotation shaft at place vertical to the center line of the gear teeth by means of the actuating cam, and it is driven along the inside supporting surface of the holder defining two arcs from the rotation center of the lock gear, so that moving interval can be adjusted and structure increasing the strength of the outside and inside gear teeth can be defined by making both sides of the lock gear contact in face to face relation. However, as the driving surface of the lock gear restraints both sides of the lock gear on the condition of contacting in face to face relation, space is formed between the lock gear and the holder supporting it to provide smooth operation and management of the moving interval to thereby result in formation of the moving interval during the operation.

BRIEF SUMMARY OF THE INVENTION

Accordingly, the present invention has been made to overcome above-mentioned problems occurring in the prior art, and it is an object of the present invention to provide a seat recliner for a vehicle which can be used without any damage and wear of the outside and inside gear teeth engaged with each other, as the turning force of the actuating cam can be directed to outside via mid point of the lock gear with regard to the centre of the actuating cam when the lock gear operated by the actuating cam engages with the inside gear teeth of the sector gear, to thereby make the outside gear teeth of the lock gear to be engaged with the inside gear teeth of the sector gear on condition of the same force being distributed to all the outside gear teeth of the lock gear so that lock gear can not be pushed in any one direction, although artificial force has been applied to the lock gear during the operation of the vehicle.

To accomplish the above objects, in accordance with the present invention, there is provided a seat recliner for a vehicle comprising a holder equipped with a lock gear guide portion having an arc shaped guide surface in a receiving portion opened at one side thereof, an upper gear formed at the inside of the receiving portion of the holder and equipped with gear teeth at the inner peripheral edge of the holder, an actuating cam located in the holder to be engaged with a rotation shaft extending through the center of the holder and having a transporting projection and a first supporting projection at predetermined intervals on the outer peripheral edge thereof, and a lock gear provided with an outside gear teeth at front surface and with a contacting surface, a first supporting surface and an engagement surface at a rear surface with the guide surface of the lock gear guide portion contacting with an outside of the lock gear, wherein the actuating cam is provided with a second supporting projection at the opposite side back of the first supporting projection with regard to the transporting projection of the actuating cam so that the lock gear can be supported at properly distributed and unbiased state, and the lock gear is provided with the contacting surface at the center thereof so that the lock gear pushed by the transporting projection can be pushed at a vertical state with regard to the center of the rotation shaft, and is provided with the first and second supporting surfaces at both sides of the contacting surface so that the first and the second supporting projections can be supported.

Furthermore, the first and second supporting projections of the lock gear are configured so that the first supporting projection is located at a linear opposite position of the second supporting projection around the center of the rotation shaft.

Also, the guide surface of the lock gear guide portion is formed to be an arc shape defined by cross points of the equilateral triangle, which are formed by crossing the center of the rotation shaft and the vertical contact lines of the outside and inside gear teeth.

Additionally, an inside contacting surface bordering a hill portion of the inside gear teeth is further formed at the inside gear teeth of the upper gear.

Meanwhile, a second engagement surface is further formed at the actuating cam so that the lock gear by means of the second supporting surface can be moved by extending the second supporting surface of the lock gear outwardly.

The above object and other object of the present invention, particular advantages and novel features of the present invention will be made apparent from the following concrete description of the preferred embodiment in connection with the appended drawings.

DETAILED DESCRIPTION OF THE INVENTION

Figure 1:
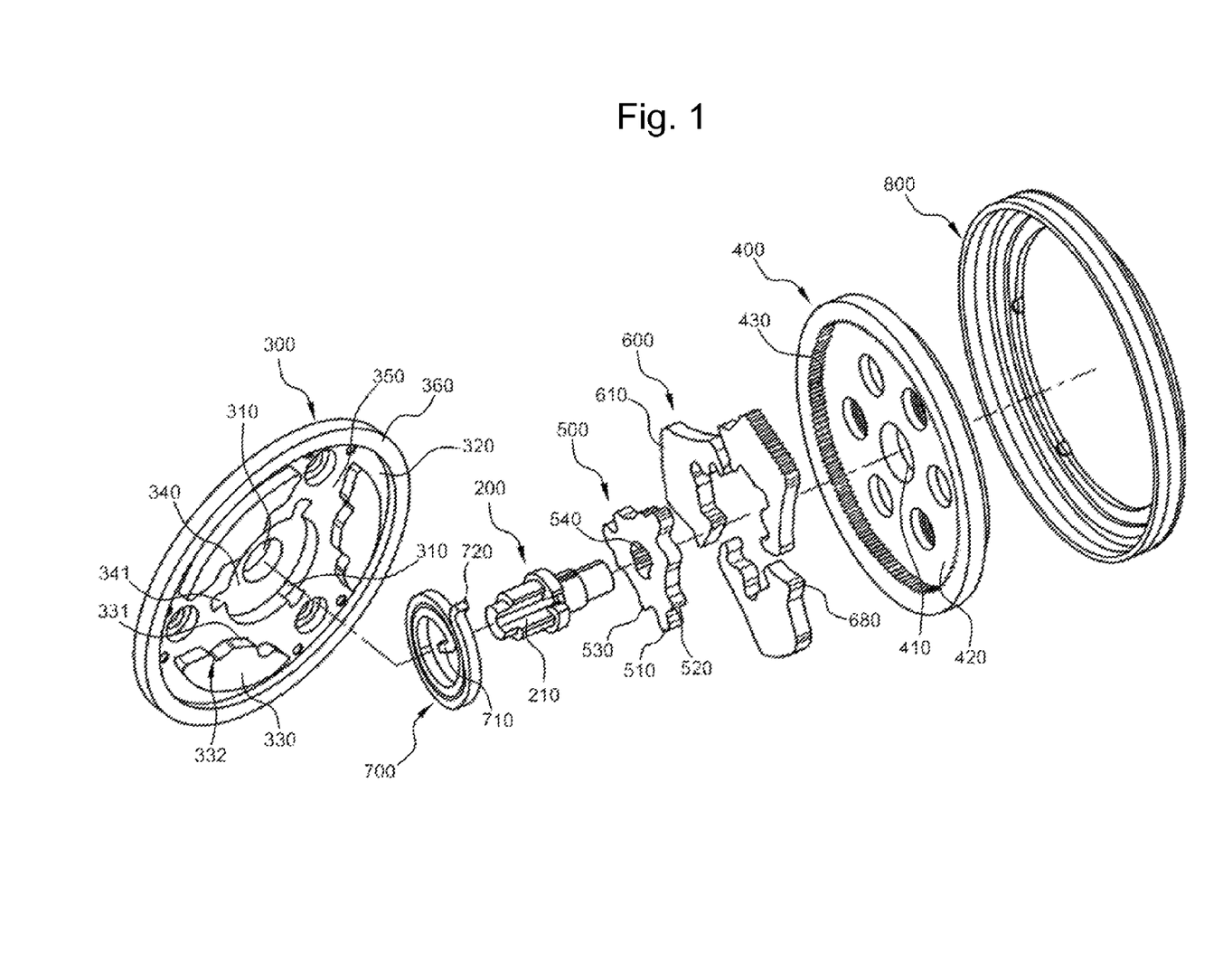
FIG. 1 is an exploded perspective view for showing structure of a seat recliner for a vehicle in accordance with the present invention.
Figure 2:
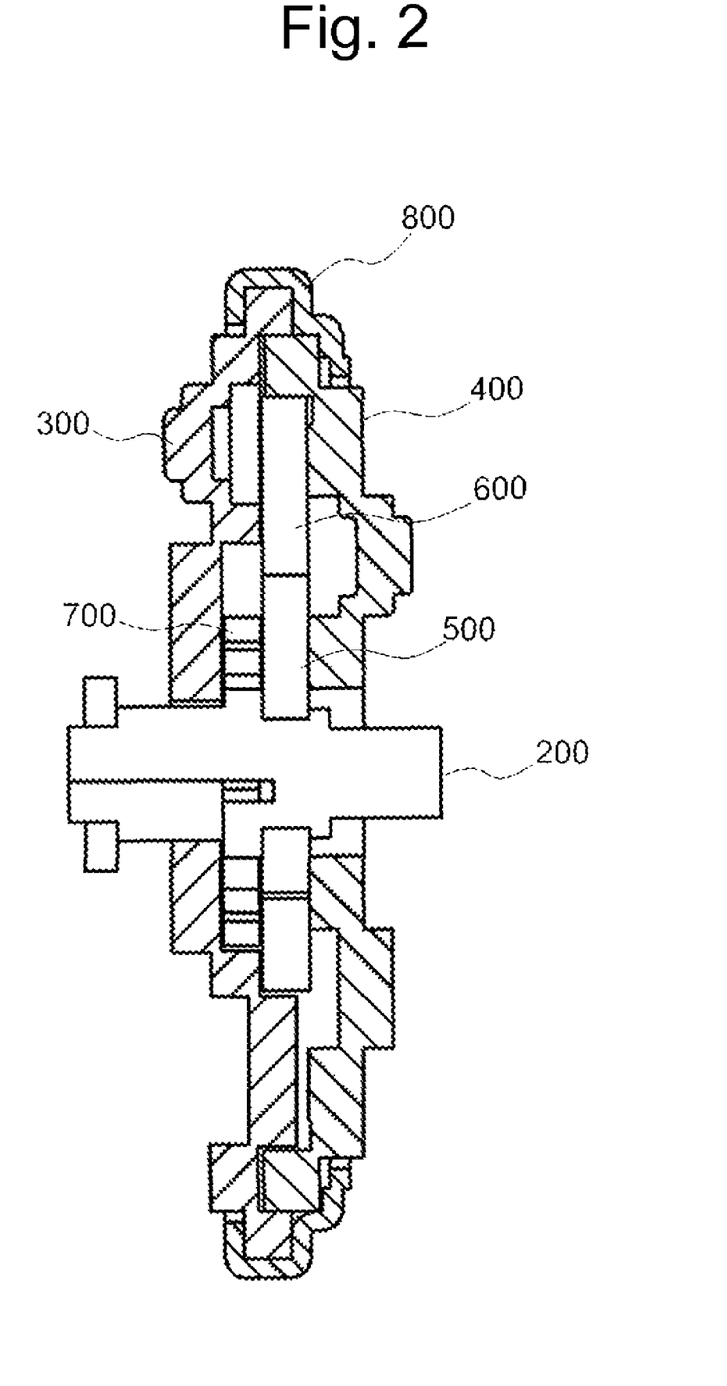
FIG. 2 is a side cross-sectional view for showing engagement state of the seat recliner for the vehicle in accordance with the present invention.

Referring to FIGS. 1 and 2, a seat recliner 100 in accordance with the present invention is provided with a rotation shaft 200, a holder 200, an upper gear 400, an actuating cam 500, a lock gear 600, a return spring 700 and a cover 800.

As a user manipulates a lever (not shown) provided at one side of a seat, the rotation shaft 200 is rotated clockwise or counterclockwise to adjust an angle of a seatback. Outside gear teeth 610 provided in the lock gear 600 are engaged with or released from inside gear teeth 430 equipped in the upper gear 400 by the rotation of the rotation shaft 200, to thereby adjust the angle of the seatback.

This seat recliner 100 in accordance with the present invention will be described in detail.

Referring to FIG. 1, the return spring 700 is a spiral spring, and its inner end 710 is fixed in a groove 210 and its outer end 720 is fixed in a fixing portion 341 of a return spring receiving portion 340 of the holder 300. A returning force is applied to the return spring 700 when a user actuates the lever fastened to one side of the rotation shaft 200, and the lever can thus be returned to an original state when the user releases the lever.

Figure 5:
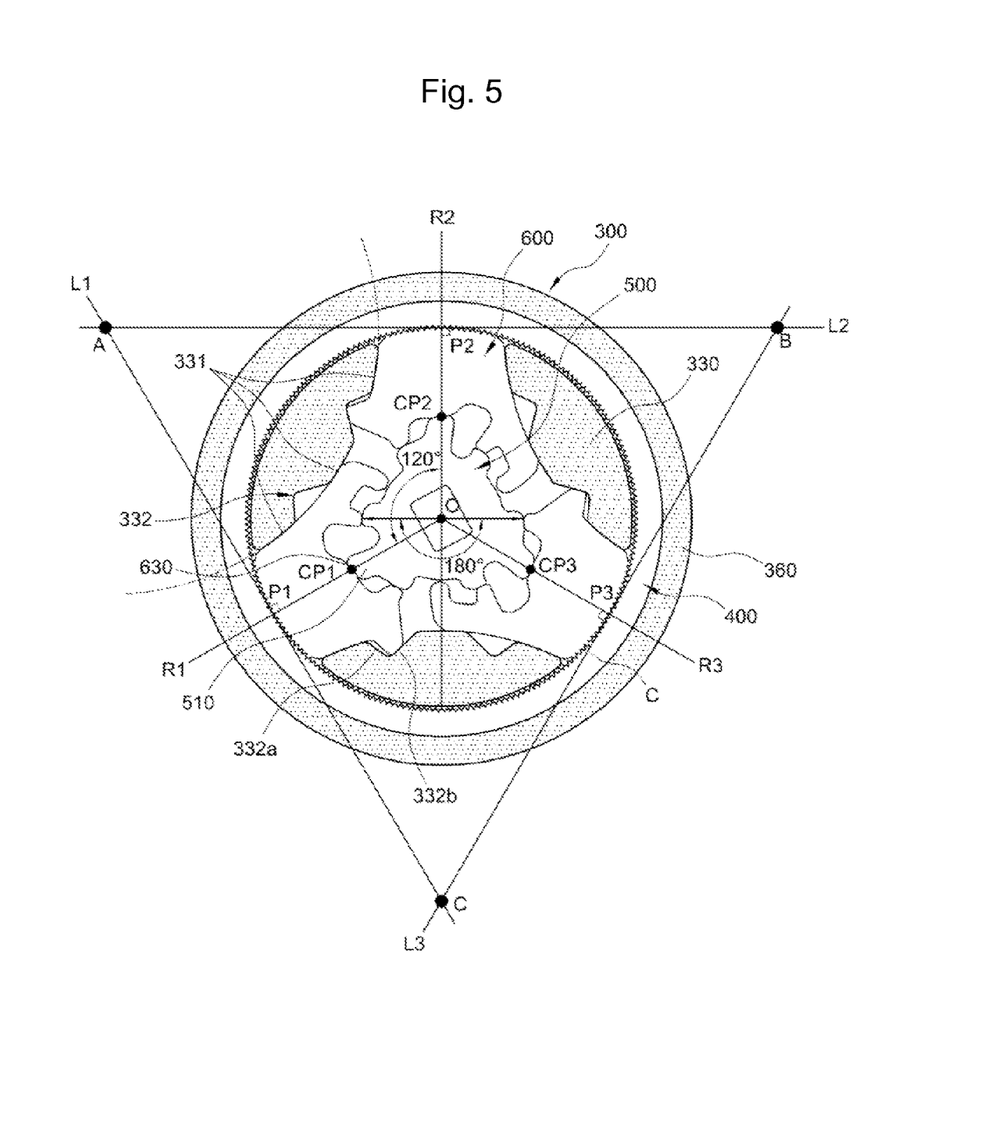
FIG. 5 is a view for showing a locking state of the seat recliner for the vehicle in accordance with the present invention, which shows a state of force distribution caused by application of pressure.

Referring to FIGS. 1 and 5, the holder 300 includes a through hole 310, a circular inside gear teeth receiving portion 320 having a predetermined thickness, three lock gear guide portions 330, the return spring receiving portion 340, a lock gear receiving portion 350 and a projection 360.

The protrusion portion 360 is formed on an outer peripheral edge of the holder 300. The projection 360 guides the inside gear teeth 430 projected from the upper gear 400 to a predetermined height to be received in the inside gear teeth receiving portion 320, a space between the projection 360 and the lock gear guide portion 330.

Referring to FIG. 5, the lock gear guide portion 330 is projected from the lock gear receiving portion 320 to a predetermined height.

The three lock gear guide portions 330 have the same shape and size, and are arranged regularly around the center O of the rotation shaft 200 with a spacing of 120 degrees. The lock gear guide portions 330 support three lock gears 600 having the same shape and size.

Each lock gear guide portion 330 is formed with two contact grooves 332 formed symmetrically on a guide surface 331 thereof with which the lock gear comes into contact. The contact groove 332 is the portion where a contact projection 680 of the lock gear 600, which will be described later, is seated, and is for stably supporting the lock gear 600 upon locking (support is made by a reference numeral 332*a*) and guiding the lock gear 600 upon release of the locking (guide is made by a reference numeral 332*b*). Since two contact grooves 332 are formed, common application to both left and right seats is enabled.

The guide surface 331 formed in the lock gear guide portion 330 will be described with reference to FIG. 5. Assuming that the outside gear teeth 610 of the lock gear 600 is engaged with the inside gear teeth 430 of the upper gear 400, i.e. it is in the locking state, it is able to draw an imaginary circle C' with the center O of the rotation shaft 200 as a center of the circle. The imaginary circle C can be made by connecting centers of respective tooth profiles when the outside gear teeth 610 and the inside gear teeth are engaged.

Figure 11:
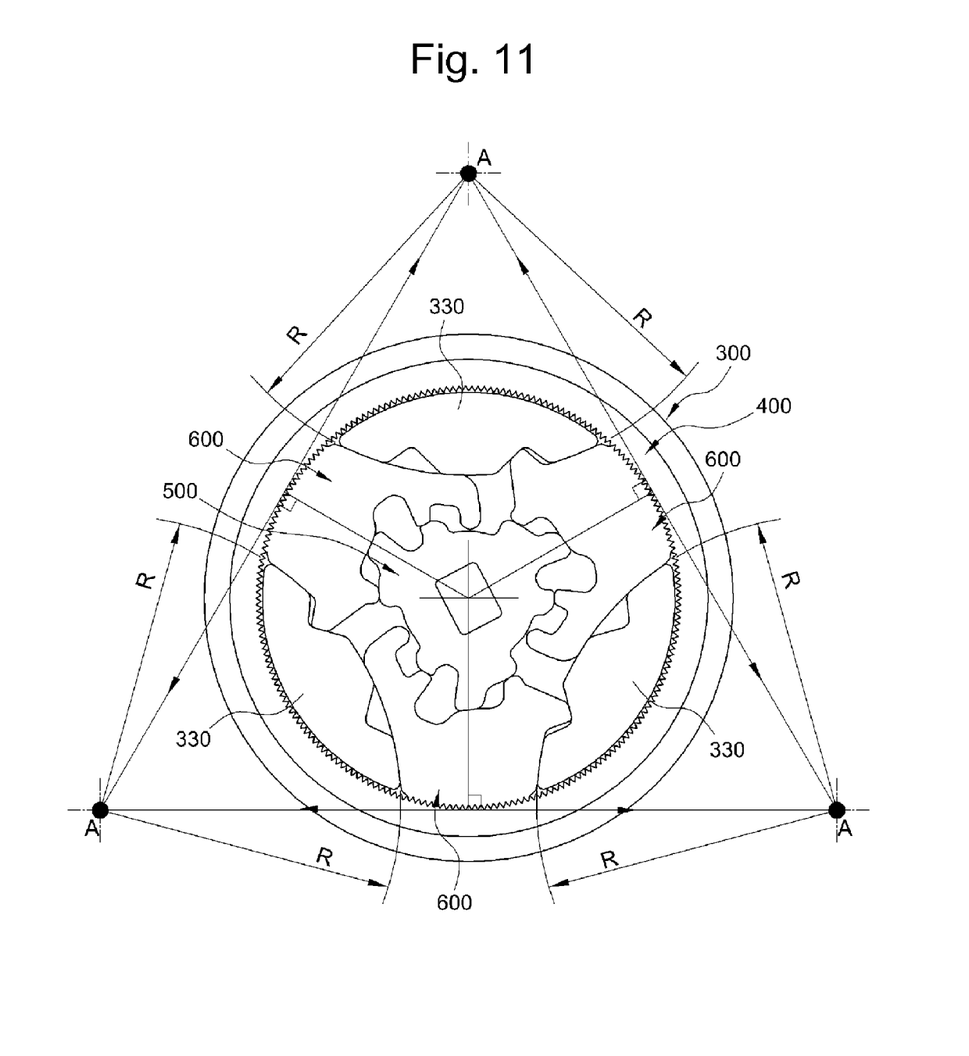
FIG. 11 is a view showing a structure in that a curved face of a seat recliner according to the present invention is formed in an arc shape on the basis of a vertex A in FIG. 10 for balanced distribution in force and strong engagement upon locking of the seat recliner in accordance with the present invention.

Referring to FIGS. 5 and 11, there are drawn tangent lines L1, L2 and L3 which are perpendicular to lines R1, R2 and R3 which connect the center O of the rotation shaft 200 and respective central points P1, P2 and P3 where the outside gear teeth 610 and the inside gear teeth 430 are engaged, and touch the imaginary circle C. Here, the lines R1, R2 and R3 are arranged equally around the center O of the rotation shaft 200 with a spacing of 120 degrees. Let intersections of the tangent lines L1, L2 and L3 be vertices A, B and C of a triangle. This triangle is a regular triangle, and to draw arcs around the respective vertices A, B and C of the triangle forms the sectional shape of the guide surface 331 of the lock gear guide portion 330.

Referring to FIG. 5, with respect to any one lock gear 600, a rotational center of the lock gear 600 is the vertex A of the triangle. Also, a contact point CP1 where a first projection 510 of the actuating cam 500 and a contact surface 635 meet upon the locking is located on the line R1 which connects the center O and the central point P1. This can effectively restrict deviation of the inside and outside gear teeth 430 and 610 causable by an external force.

Also, an external force generated in the recliner due to collisions, quick start or quick stops of a vehicle and applied forwardly and backwardly is concentrated in the lock gear guide portion 330. In order to effectively deal with deformation by the external force concentrated in the lock gear guide portion 330, location and a width b or load per corresponding area of the lock gear guide portion 330 placed in a limited spaced are important.

To efficiently overcome aforementioned matter, the lock gear guide portions are arranged equally around the center O with a spacing of 120 degrees. Also, the basis of setting the shape of the guide surface 331 to the aforementioned shape in order to ensure optimal width b of the lock gear guide portion is as follows.

Figure 10:
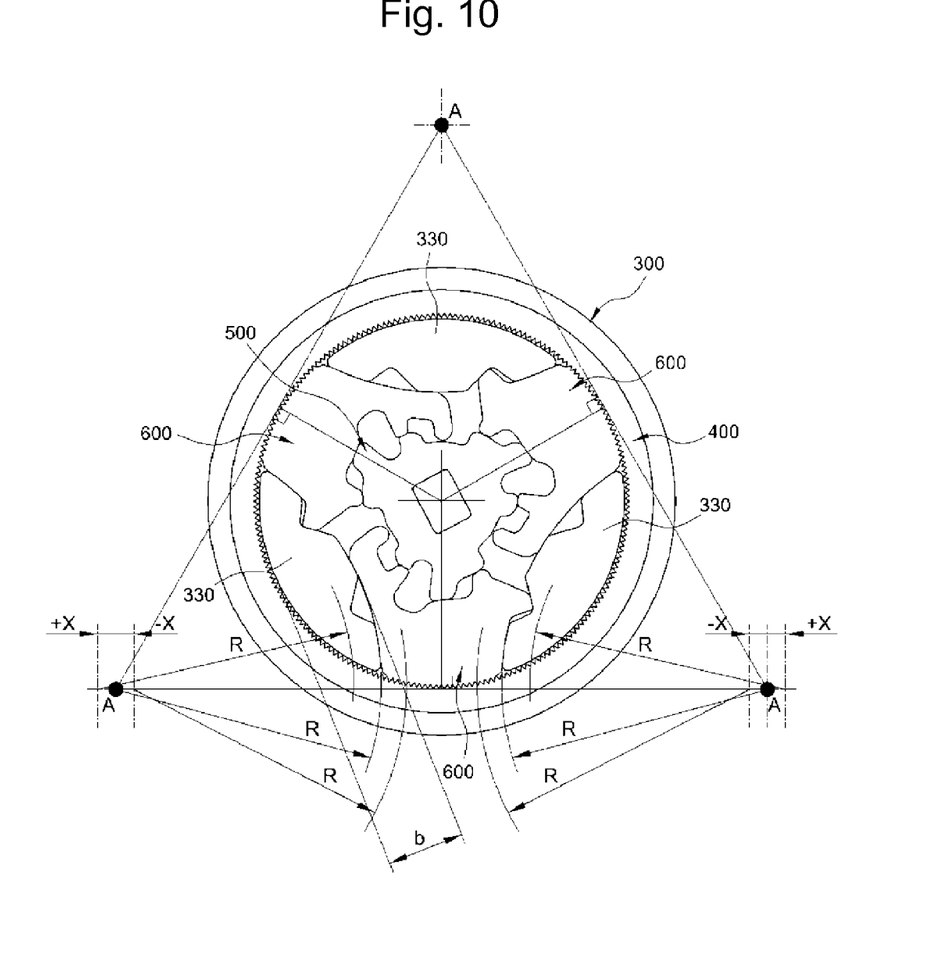
FIG. 10 is a conceptual view for explaining balanced distribution in force on the basis of vertex A for optimal set up of a lock gear guide portion of a seat recliner in accordance with the present invention.

Referring to FIG. 10, when moving the vertex A of the regular triangle in [+X] direction, the width b of the lock gear guide portion becomes small and the supporting load to the external force is thus lowered. To the contrary, when moving in [−X] direction, the guide surface 331 is set up so that it is overlapped with the outside gear teeth 610 of the lock gear 600, to reduce the number n of the teeth of the outside gear teeth 610 required for a strength of tooth engagement force for high strength, and this lowers overall strength of the recliner 100.

The set up of the vertex A as in the present invention has the same influence on the recliner according to the action of the forward and backward external force, and it is possible to set up the optimized lock gear guide portion 330 for the strength that is able to correspond to the forward and backward external force when the center of the guide surface 331 is located in the vertices A, B and C of the regular triangle.

Figure 3:
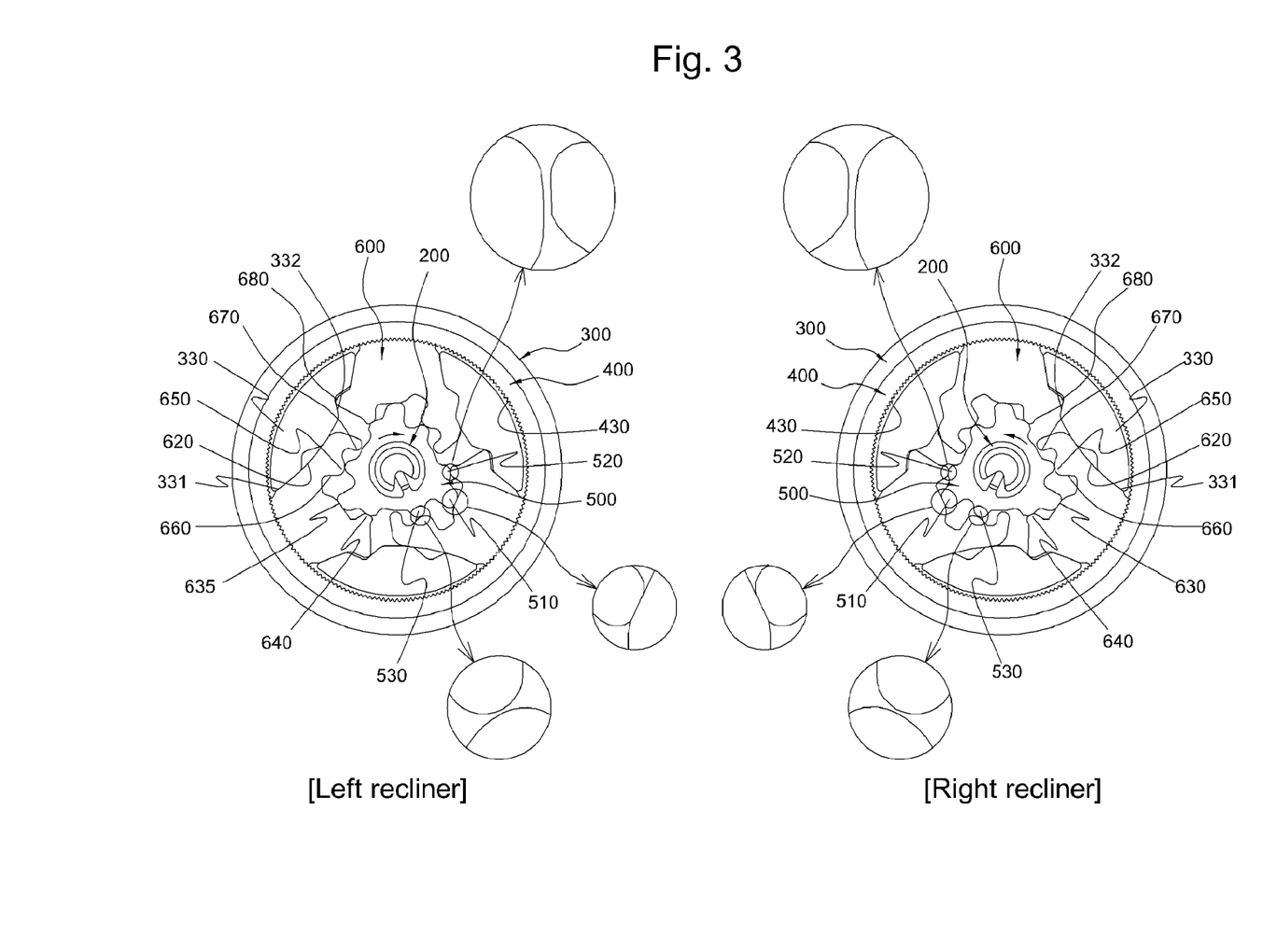
FIG. 3 is a planar view for showing operating state of the seat recliner for the vehicle in accordance with the present invention at the time of locking.

Also, referring to FIG. 3, overall shape of the holder 300 may have a symmetrical shape which can be commonly applied to both left and right seats of the vehicle. Accordingly, it is not necessary to make separate molds for a left recliner and a right recliner upon the manufacture of the recliner, and this enables common use of the mold. Therefore, it is possible to save cost for manufacture and maintenance.

Referring to FIG. 1, the upper gear 400 is inserted between an inner circumference of the receiving portion 320 of the holder 300 and an outer circumference of the lock gear guide portion 330, i.e. in the inside gear teeth receiving portion 320. The upper gear 400 is provided with a receiving portion 420 opened at one side thereof so that the lock gear 600 can rotate freely in this state. The receiving portion 420 is provided at an inner circumference thereof with the inside gear teeth 430 with which the outside gear teeth 610 is engaged.

Figure 6:
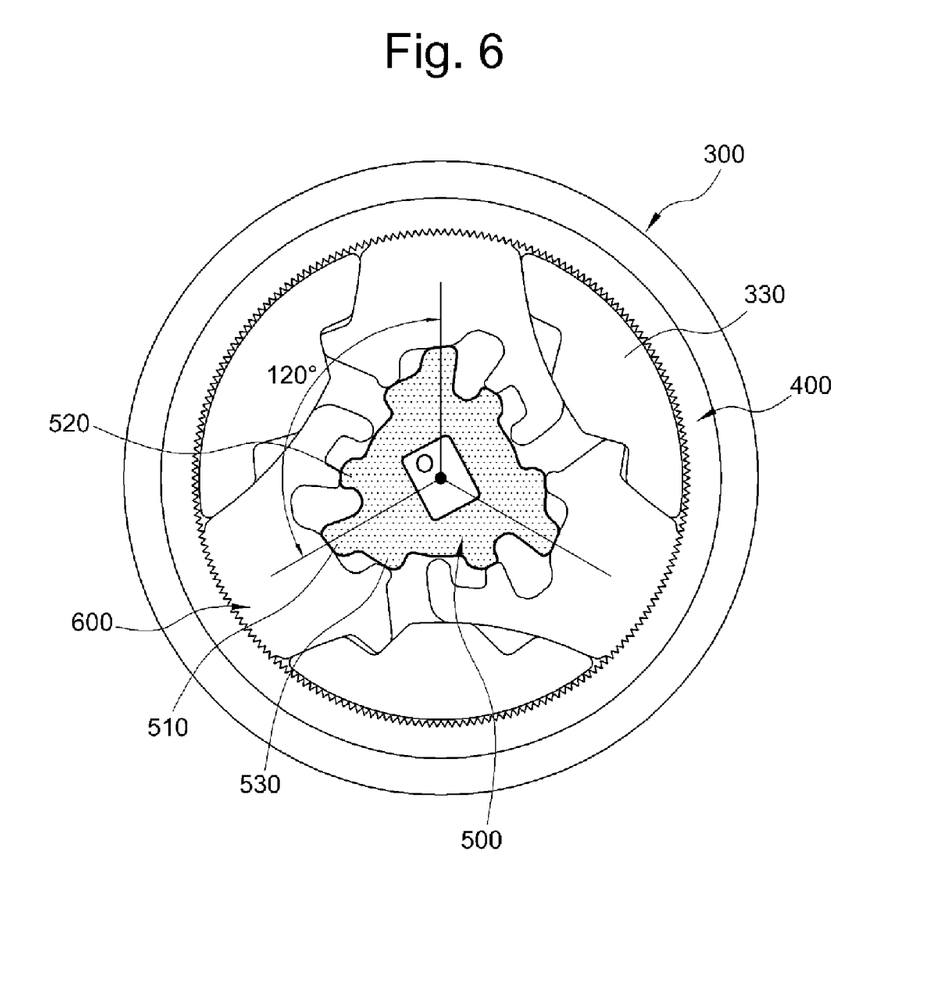
FIG. 6 is another view for showing a symmetrical distribution of the force in FIG. 5.

Referring to FIGS. 1 and 6, the actuating cam 500 is formed with a through hole 540 in the middle thereof so that the rotation shaft 200 is fitted into the through hole. Also, the actuating cam 500 is formed with three first projections 510 around the center of the rotation shaft 200 with a spacing of 120 degree, and second and third projections 520 and 530 at left and right sides of the first projection 510. Detailed operation according to the rotation of this actuating cam 500 will be described later since it is related with the lock gear 600.

Figure 7:
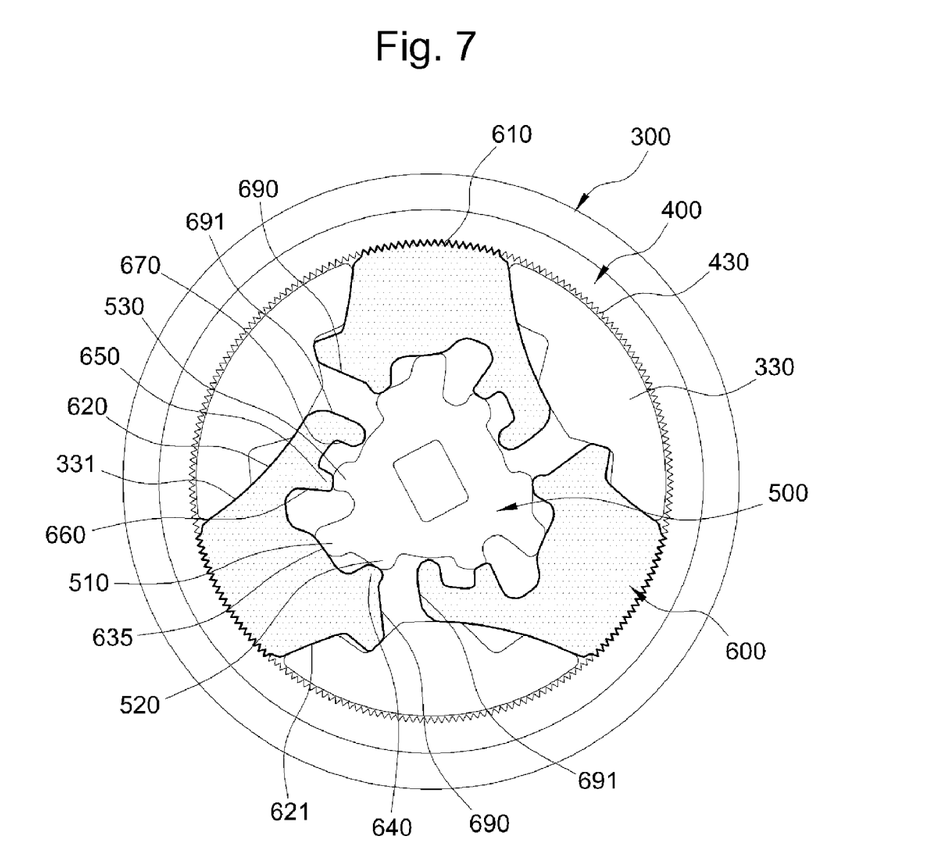
FIG. 7 is yet another view for showing a balance of the force in which outside gear teeth of a lock gear is engaged with inside gear teeth of an upper gear in FIG. 5.

Referring to FIGS. 1 and 7, the number of the lock gear 600 is three and they have the same shape and size. Also, the lock gear 600 is provided with the outside gear teeth 610 that is engaged with the inside gear teeth 430. The lock gear 600 is provided with a first moving surface that moves with being in contact with the lock gear guide portion 330, and a second moving surface 621 that supports the lock gear guide portion 330 with being in contact with the lock gear guide portion 330 upon the locking. The first moving surface 620 and the second moving surface 621 are provided at left and right sides of the outside gear teeth 610, respectively. The first moving surface 620 is provided with a second contact surface 691 at an upper side thereof, and the second moving surface 621 is provided with a first contact surface 690 at an upper side thereof In one lock gear 600, the first contact surface 690 comes into contact with the second contact surface 691 of adjacent another lock gear 600 upon the release of the locking. Likewise, in one lock gear 600, the second contact surface 691 comes into contact with the first contact surface 691 of adjacent another lock gear 600.

Also, the lock gear 600 is provided with the ground surface 635 that comes into contact with the first projection 510 of the actuating cam 500, a first supporting surface 640 that comes into contact with the second projection 520 of the actuating cam 500 and a second supporting surface 650 that comes into contact with the third projection 530 of the actuating cam 500, upon the locking.

In addition, upon release of the locking, the third projection 530 of the actuating cam 500 is engaged with a second engaging surface 670 by the rotation of the actuating cam 500 and the first projection 510 is then engaged with a first engaging surface 660.

Figure 4:
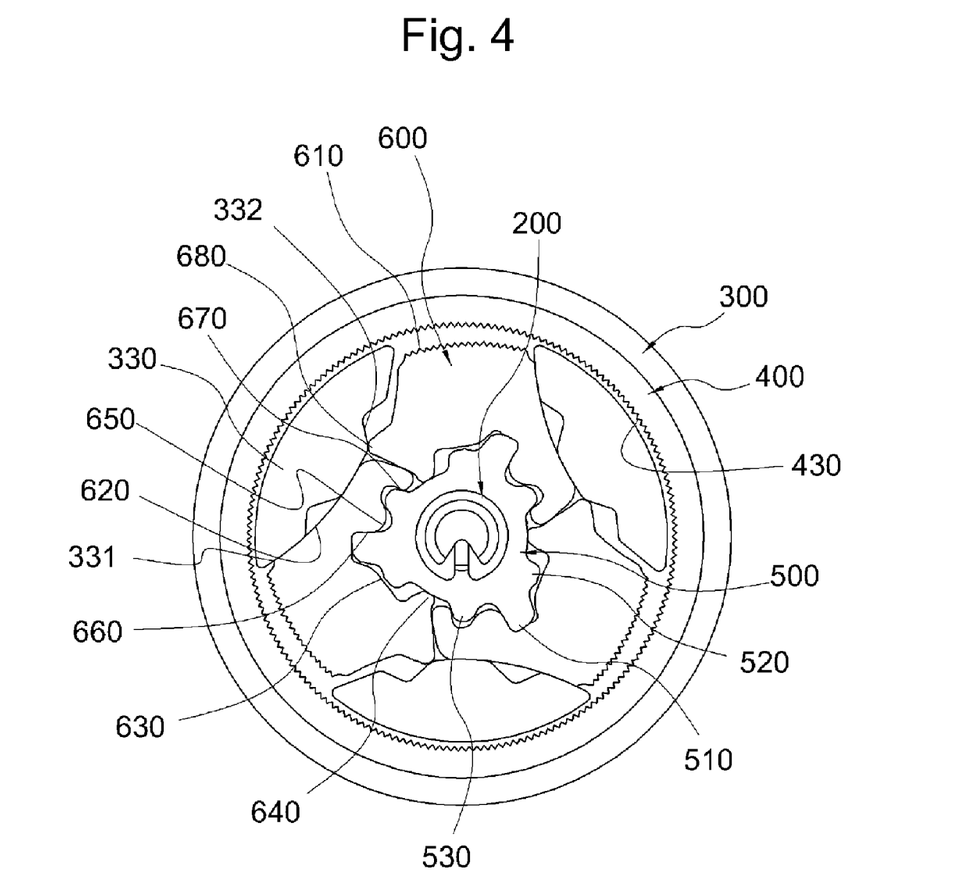
FIG. 4 is a planar view for showing operating state of the seat recliner for the vehicle in accordance with the present invention at the time of relief of locking.

The operation that the recliner is locked in the stated of being actuated as described above will be described with reference to a left recliner of FIG. 3 and FIG. 4: the lock gear in contact with the first projection 510 of the actuating cam 500 is pushed down along the guide surface 331 in correspondence to the rotation angle of the first projection 510 of the actuating cam 500. After that, when the first projection 510 is located on the contact surface 535 of the lock gear 600, the outside gear teeth of the lock gear 600 is maintained in the state of being engaged with the inside gear teeth 430 of the upper gear 400. Upon the locking state, the first projection 510 is located at the very middle of the outside gear teeth 610 of the lock gear 600. Since the lock gear 600 which is pushed outward by the first projection 510 pushes the inside gear teeth 430 in a direction of the lines R1, R2, R3 that which connect the center O of the rotation shaft 200 and respective central points P1, P2 and P3 where the outside gear teeth 610 and the inside gear teeth 430 are engaged, it is possible to effectively restrict deviation pressure applied to the inside and outside gear teeth 430 and 610.

Referring to FIG. 3, at this time, the second and third projections 520 and 530 provided at both sides of the first projection 510 are not in contact with the first and second contact surface 640 and 650 but are remained close to them in the state that the first projection 510 pushes the contact surface 635 of the lock gear firmly.

Referring to FIG. 5, when quick stops, quick starts or collision of a vehicle occurs during the vehicle runs in the normal state and an external force is applied in a direction of the force applied to a seatback, i.e. a clockwise direction, the lock gear 600 is pushed inwardly and thus the second supporting surface 650 is pushed with being in contact with the third projection 530 of the actuating cam 500. In this case, another second projection 520 equipped in the side diametrically opposite to the third projection 510 maintains the state of being in contact with the first supporting surface 640 of another lock gear 600.

When the force is applied in a counterclockwise direction, the lock gear 600 is pushed inwardly and thus the first supporting surface 640 is pushed with being in contact with the second projection 530 of the actuating cam 500. In this case, another third projection 530 equipped in the side diametrically opposite to the second projection 520 maintains the state of being in contact with the second supporting surface 650 of another lock gear 600, and a dynamic force is transferred to the divided lock gear 600. Since the lock gear 600 is engaged without being pushed to one side, it is possible to prevent the inside and outside gear teeth 430 and 610 from being worn down and damaged upon use.

Figure 8:
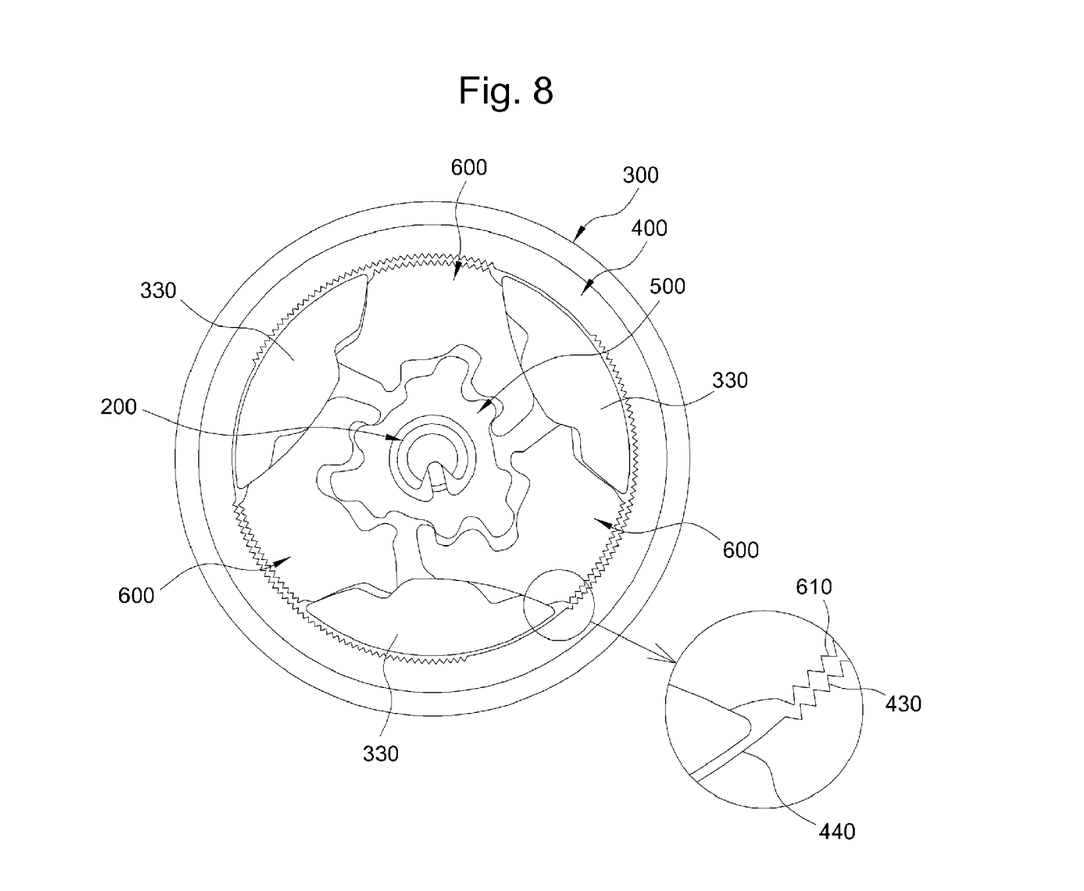
FIG. 8 is a planar view for showing another embodiment of the seat recliner for the vehicle in accordance with the present invention at the time of relief of locking for rotating a seatback.
Figure 9:
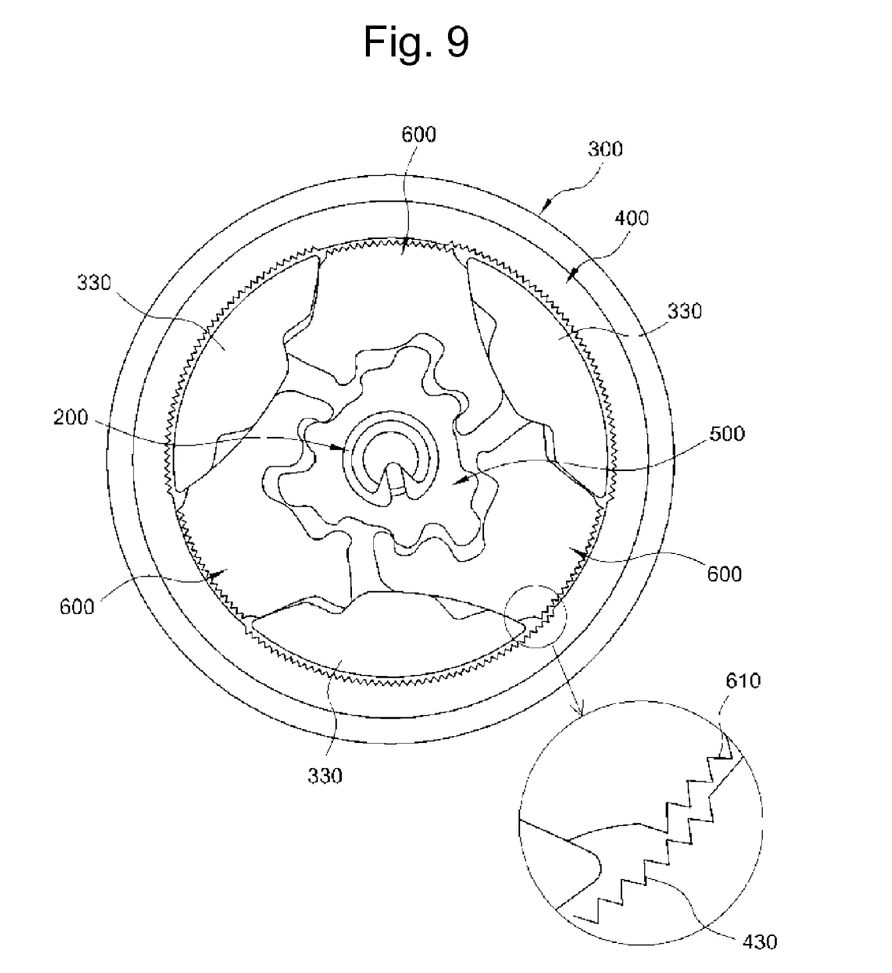
FIG. 9 is a planar view for showing still another embodiment of the seat recliner for the vehicle according to the present invention at the time of rotation of the seatback.

Referring to FIGS. 8 and 9, to recline the seatback forward will be described: in a case of a 3-door vehicle such as a sports vehicle, a fellow passenger to be seated in a rear passenger seat gets the vehicle on and off in a state that a seatback of a driver's seat or a front passenger seat is reclined forward. An inscribing surface 440 may be provided with taking a gear thread of the inside gear teeth 430 which is an inscribing surface thereof as a starting point so that the outside gear teeth 610 of the lock gear 600 is not engaged with the inside gear teeth 430 only within a range of angle between where the seatback is completely reclined forward and where the seatback is in its vertical position.

That is, in a state that the seatback is reclined backward from its vertical position, the outside gear teeth 610 of the lock gear 600 is operated in the range of the inside gear teeth 430 of the upper gear 400 to thereby allow the user to freely adjust the angle of the seatback to the angle desired by the user. If the fellow passenger wants to get on and off the rear passenger seat of the vehicle, by pulling the lever which rotates the rotation shaft, the actuating cam 500 pulls the lock gear 600 in an inward direction to space the inside and outside gear teeth 430 and 610 apart from each other, and then the seatback is reclined forward by an unwinding elastic force of the return spring 700 to place the outside gear teeth 610 of the lock gear in the inscribing surface provided in the inside gear teeth 430.

When standing the seatback up from this state after the fellow passenger gets on and off the vehicle, the outside gear teeth 610 of the lock gear 600 is not engaged with the inside gear teeth 430 by the inscribing surface 440 until the seatback reaches to the vertical position. If the user pivots the seatback to its vertical position without manipulation of the lever, the outside gear teeth 610 is engaged with the inside gear teeth 430, during rotation of the upper gear 400, at a point where it gets completely out of the inscribing surface 440, and the seatback therefore remains its vertical position.

In this state, if the user wants to recline the seatback backward, the same means of the former is used to recline the seatback so that the driver or the passenger seats on a seat conveniently.

In the seat recliner 100 of the present invention as described above, rotation centers of the lock gears 600 are located in the points A, B and C where the lines R1, R2 and R3 and the lines L1, L2 and L3 perpendicular to the lines R1, R2 and R3 meet with each other, respectively. The lines L1, L2 and L3 that connect the rotational centers touch the imaginary circle that connects the centers of the respective tooth profile. Therefore, when an external force is applied to the seat recliner 100, the load concentrated in the inside and outside gear teeth 430 and 610 is distributed to the rotational centers A, B and C to thereby increase the strength. Furthermore, the contact surface 635 of the actuating cam 500 that meets the first projection 510 of the lock gear 600 upon the locking is located in the center of the tooth profile of the outside gear teeth 610 and it is therefore possible to effectively restrict deviation of the inside and outside gear teeth 430 and 610 causable by an external force.

What is claimed is:

1. A seat recliner for a vehicle, the seat recliner comprising:
    a holder equipped with a lock gear guide portion in a receiving portion opened at one side thereof, the lock gear guide portion having an arc shaped guide surface;
    an upper gear comprising inside gear teeth formed at an inner peripheral edge of the upper gear, the upper gear being engaged with the holder;
    an actuating cam located in the holder to be engaged with a rotation shaft extending through center of the holder, and the actuating cam having a transporting projection and a first supporting projection at predetermined intervals on an outer peripheral edge thereof; and
    a lock gear including outside gear teeth at outside surface and with a contacting surface, a first supporting surface and a first engagement surface at a rear surface with the guide surface of the lock gear guide portion contacting with an outside of the lock gear,
    wherein the actuating cam is provided with a second supporting projection at an opposite side of the first supporting projection with regard to the transporting projection of the actuating cam,
    wherein the lock gear is provided with the contacting surface at a center thereof so that the lock gear pushed by the transporting projection can be pushed with regard to a center of the rotation shaft, and is provided with the first supporting surface and a second supporting surface at both sides of the contacting surface so that the first supporting projection and the second supporting projection can be supported,
    wherein the arc shaped guide surface is formed by a vertex of an equilateral triangle, wherein the equilateral triangle is formed by contact lines of the outside and inside gear teeth and the each of the contact lines is perpendicular to a line, which joins the center of the rotation shaft with the each of the contact lines, and
    wherein the lock gear further comprises a second engagement surface for separating the inside and outside gear teeth at time of releasing a locking state by engaging with the actuating cam.

2. The seat recliner according to claim 1, wherein the upper gear further comprises an inscribing surface formed at an inner peripheral edge of the upper gear.

* * * * *